United States Patent Office 3,753,965
Patented Aug. 21, 1973

3,753,965
METHOD FOR PRODUCING NON-BLOCKING ETHYLENE-ACRYLIC ACID COPOLYMER ARTICLES AND ARTICLES PRODUCED THEREBY
Glenwell Ray Looney and Mark Chung-Kong Hwu, St. Albans, W. Va., assignors to Union Carbide Corporation, New York, N.Y.
No Drawing. Filed Oct. 21, 1971, Ser. No. 191,356
Int. Cl. C08f 15/04, 15/14
U.S. Cl. 260—88.1 R      7 Claims

ABSTRACT OF THE DISCLOSURE

Ethylene-acrylic acid copolymers in particulate form, such as, chips, rods, etc., are surface treated with a base such as sodium hydroxide, ammonia or diethylamine to render the shaped articles less prone to blocking or sticking. The treatment converts the carboxyl groups on the surface to the salt form; up to about 2.5 weight percent of the total carboxyl groups in the copolymer are converted and the properties of the original polymer are not altered to any appreciable extent as indicated by melt index and stiffness measurements.

BACKGROUND OF THE INVENTION

Polymers of ethylene and acrylic acid, including terpolymers thereof with other monomers, have long been known. These polymers have many known uses in the film, adhesive, extrusion and molding fields, and such uses are commercially established.

The polymers containing small amounts of acrylic acid of less than ten weight percent do not pose any problems when stored. However, pellets or chips of the polymers containing at least ten weight percent acrylic acid tend to block and stick together when warm and under the pressure generated by the weight of the resin on storage. They also tend to bridge in handling systems because of buildup of static charge. Particular problems are encountered when the acrylic acid copolymer is in a particulate form such as pellet or chip because of the tendency to stick and block on storage, in shipping, and in fabricating equipment lines to such an extent that economic losses and production shutdowns result.

SUMMARY OF THE INVENTION

It has now been found that the treatment of the surface of a polymer of ethylene and acrylic acid in particulate form with a base for a short period of time will produce a product that is less prone to blocking or sticking on storage or bridging in processing equipment. In the process of this invention the surface of the polymer is treated for a period of from several seconds to several minutes with the base, either in solution or not. This treatment forms a salt coating on the surface of the polymer particulates by reaction of the base with the free carboxyl groups on the surface of the molecule. The extent of surface conversion is generally up to about 2.5 weight percent of the total amount of carboxyl groups present in the copolymer and is so small that the properties of the ethylene-acrylic acid polymer are not significantly altered as indicated by melt index and stiffness measurements. This is in contrast to that which has been the practice in the past, wherein the polymers were treated with a base to convert an appreciable amount of the carboxyl groups to the corresponding salt or ionomer resulting in major and significant changes in the properties of the ethylene-acrylic acid copolymers.

DESCRIPTION OF THE INVENTION

In the process of this invention a solid polymer of ethylene with acrylic acid, in which the acrylic acid content can vary from about 10 weight percent to about 50 weight percent, or more, is treated with a base solution to render the surface of the polymer non-blocking during storage and processing. The treatment can be carried out at any temperature below the melting point of the polymer and it is preferably carried out at from about 0° C. to about 60° C. The pressure is not critical and can be atmospheric or superatmospheric. The reaction time will vary depending on factors such as temperature, pressure and concentration of the base solution. With sodium hydroxide or potassium hydroxide solutions the treatment time is of the order of about several minutes, i.e., about 1 to 3 minutes, and it is preferably from about 10 to about 40 seconds. With an organic amine the time is of the order of from about one minute to about 20 minutes.

Among the bases useful in this invention are the inorganic alkali metal hydroxides or carbonates, such as, sodium hydroxide, potassium hydroxide, lithium hydroxide, sodium carbonate, or potassium carbonate; anhydrous ammonia or aqueous ammonia; the organic amines such as pyridine, alkyl amines or alkanol amines having up to about six carbon atoms in the aliphatic chain thereof such as methylamine, trimethylamine, ethylamine, diethylamine, triethylamine, propylamine, tripropylamine, butylamine, diisobutylamine, N-methylbutylamine, N-ethylcyclohexylamine, ethylenediamine, diethylenetriamine, 1,2-propylenediamine, 1,3-diaminopropane, N,N-dimethylethanolamine, N-methylethanolamine, N-aminoethylethanolamine, diisopropanolamine, and the like.

The concentration of the base solution that is used in the treatment of the polymer surface can vary from about 0.05 normal to about 10 normal, preferably it is from about 0.1 normal to about 1 normal. The base can be dissolved in an aqueous medium or in any inert organic solvent, for example, ethanol or isopropanol.

The polymer can be treated in any shaped form whatsoever pellet, rod, film, fiber or filament, sheet, or the like. Generally, the most troublesome blocking problems arise when storing the polymer in pellet form after production and before ultimate use or shipment. Consequently, this invention finds particular use in the treatment of pellets.

In the process of this invention the treatment affects only the surface of the polymer and does not significantly alter the original physical or chemical properties of the polymer as a whole. Our invention is the discovery that conversion of not more than about 2.5 weight percent of the original carboxyl groups, on the surface areas of the polymer, to the corresponding salt is sufficient to prevent blocking or sticking or bridging of the particles without any significant change in the polymer properties. The polymer is thus treated with the base solution to convert up to about 2.5 percent of the total carboxyl groups to the corresponding salt to render the polymer less prone to blocking or sticking or bridging.

As previously indicated, the surface of the polymer is treated. This can be carried out by any conventional procedure, either continuously or in a batchwise manner. The polymer can be sprayed or washed with the base solution, it can be soaked in the base solution, or it can be conveyed through the base solution; these are merely illustrative. Thus, a film or fiber can be passed through the base solution at the desired temperature for the period of time described and then washed with water to remove surface-retained base and dried; or they can be soaked in the base solution, washed, dried and directed to storage or packaging operations, without excess or superfluous handling and without fear of undue blocking of conveyer lines, storage bins or in packages.

The degree with which the pellets blocked or stuck together was determined by a simple laboratory test. In this test a tube was immersed in a thermostatically controlled bath, the immersed end of the tube was sealed. A tube of narrower diameter was inserted inside the first tube. Two about equally sized pellets of the pellets of the polymer being tested were placed one on top of the other at the bottom of the inner, narrower tube. Then a glass rod of known weight was inserted and rested on the top pellet applying a force to press the pellets together. The entire assemblage was permitted to stand for the time desired at a preselected temperature. Any desired atmosphereic condition (air, nitrogen, moist air) can be obtained by permitting a gentle flow of the selected gas to flow into the immersed system. At the end of the desired test period, the pellets were removed and examined to determine whether there was any sticking or blocking, this was rated as none, very slight (they fall apart from their own weight), slight (do not fall apart from their own weight) definite (a force of a few grams is necessary to pull them apart) and firm (a force of a few pounds is required).

The following examples further serve to describe this invention:

EXAMPLE 1

Fifty grams of a copolymer of ethylene and acrylic acid, having a melt index of 197 decigrams per minute and an acrylic acid content of 20 weight percent, were placed into a beaker containing 225 ml. of 0.1 N sodium hydroxide at 60° C. for 30 seconds. The pellets ranged in size from about ⅛ inch to about ¼ inch in diameter. They were then washed with water, dried at 60° C. for two hours and then 70° C. for two hours. Titration of the spent liquor indicated a conversion of less than one percent of the carboxyl groups to sodium carboxylate groups. The surface treated polymer pellets were free-flowing and showed no signs of blocking or bridging in the container, nor did they show any tendency to block or stick together by the pressure sticking test. The untreated pellets evidenced blocking and bridging in the container and stuck together by the pressure sticking test. In a further control test, the pellets were treated with water under the same conditions described above. It was observed that they were bunching together in a mass.

EXAMPLE 2

Using the same polymer and the same procedure described in Example 1, the pellets were treated with 0.1 N sodium hydroxide solution at room temperature for 30 seconds. The surface treated pellets showed no signs of blocking or bridging on storage for over twenty four hours, whereas, the untreated pellets did.

EXAMPLE 3

Using the same polymer and the same procedure described in Example 1, the pellets were surface treated with 0.1 N potassium hydroxide solution at room temperature for 30 seconds. The treated pellets showed no signs of blocking following the test procedure previously described at 60° to 70° C. for 40 hours, nor did they evidence any bridging tendency on storage for 24 hours at room temperature.

EXAMPLE 4

Fifty grams of a copolymer of ethylene and acrylic acid, having a melt index of 197 decigrams per minute and an acrylic acid content of 20 weight percent were placed into a beaker containing 200 ml. of 1 N ammonium hydroxide at 20° C. for 20 minutes. The pellets ranged in size from about ⅛ inch to about ¼ inch in diameter. They were then washed with water and dried at 60° C. for two hours. These surface treated pellets were free-flowing and showed no signs of fusion or of blocking or sticking in the container or on storage for 24 hours at room temperature. The untreated pellets evidenced blocking and sticking on storage as well as fusion on heating. When these polymer pellets were treated with 0.1 N ammonium hydroxide at 20° C. for only 30 seconds, the pellets showed decreased signs of blocking but no fusion was noticed on heating.

EXAMPLE 5

Fifty grams of a copolymer of ethylene and acrylic acid, having a melt index of 197 decigrams per minute and an acrylic acid content of 20 weight percent, were placed into a beaker containing 200 ml. of 7.3 grams of N,N diethylamine in water at 20° C. for 20 minutes. The pellets ranged in size from about ⅛ inch to about ¼ inch in diameter.

They were then washed with water and dried at 70° C. for 2 hours. These treated pellets were free-flowing and showed no signs of blocking or bridging in the container or storage. In contrast, the untreated pellets blocked and bridged on storage at room temperature and fused on heating to about 40° to 50° C.

EXAMPLE 6

Using the same polymer and the same procedure described in Example 1, the pellets were treated with an aqueous solution containing 8.9 grams of dimethylethanolamine at 20° C. for 20 minutes. The pellets showed no signs of blocking or bridging in the container or on storage at room temperature.

EXAMPLE 7

One hundred gram portions of pellets of ethylene-acrylic acid copolymer, ranging from ⅛ inch to ¼ inch in size, were placed in a container with an accurately known amount of dilute sodium hydroxide solution and stirred at room temperature. Samples of the base solution were removed and analyzed periodically until the desired conversion was attained. At that point the base solution was drained out, the pellets were washed with about 250 ml. of distilled water that was quickly drained out, and they were then dried. Analysis of the residual base solution and wash water permitted the determination of the percentage carboxyl groups neutralized. The original copolymer had a melt index of 258 decigrams per minute and an acrylic acid content of 17.84 weight percent. The treated pellets were passed through a two roll mill to form a homogeneous plaque and this was then used to determine stiffness (ASTM Method D-638, Type 4 die) and melt index (ASTM Method D-1238). The treated pellets did not stick or block on storage. The stiffness and melt index determinations indicated that this surface treatment did not significantly alter the properties of the resin. When more than 2.5 weight percent of the carboxyl groups had been neutralized an appreciable increase in stiffness and an appreciable decrease in melt index was observed. Thus, the method of this invention provides a means for improving the storageability properties of an ethylene-acrylic acid copolymer without significantly changing the stiffness or melt index of the copolymer. In general, the stiffness will not show an increase in value that is much more than about 15 percent higher and the melt index will not change by more than about ±10 percent. The results are tabulated below, wherein the data shows that at neutralizations up to about 2.5 weight percent there are no significant changes in these properties, whereas at neutralizations above that value there are significant changes in these properties.

| Run | Treatment Time, min. | NaOH | Neutralization, percent | Stiffners, p.s.i. | Melt index, dgm./min. |
| --- | --- | --- | --- | --- | --- |
| A | 0 | 0 | 0 | 4,500 | 258 |
| B | 3.5 | 200 cc./0.1 N | 0.5 | 5,000 | 240 |
| C | 10 | 230 cc./0.1 N | 1.1 | 5,300 | 271 |
| D | 30 | 250 cc./0.1 N | 1.9 | 4,555 | 258 |
| E | 10 | 250 cc./0.1 N | 2.3 | 4,800 | 248 |
| F | 120 | 280 cc./0.1 N | 3.0 | 6,500 | 197 |
| G | 240 | 500 cc./0.1 N | 5.9 | | 198 |
| H | 1 4 | 2,800 cc./0.01 N | 7.1 | 7,000 | 165 |
| I | 55 | 240 cc./0.5 N | 9.7 | | 136 |
| J | 120 | 550 cc./0.1 N | 16.1 | 14,300 | 70 |

[1] Days.

What is claimed is:

1. A method for surface treating pellets or chips of a copolymer of ethylene with from 10 to 50 weight percent acrylic acid to render them less prone to blocking and sticking comprising contacting the surface of said copolymer articles with a solution of a base for a period of time sufficient to convert surface carboxyl groups to the salt thereof, said surface treating not otherwise significantly altering the chemical and physical properties of said copolymer and said method converting a positive amount up to 2.5 weight percent of the total carboxyl groups in the polymer to the salt form thereof.

2. A method as claimed in claim 1, wherein the temperature is from 0° C. to 60° C.

3. A method as claimed in claim 1, wherein the base is an inorganic alkali metal base.

4. A method as claimed in claim 1, wherein the base is ammonia.

5. A method as claimed in claim 1, wherein the base is an organic amine.

6. A method as claimed in claim 3, wherein the base is sodium hydroxide or potassium hydroxide.

7. A method as claimed in claim 5, wherein the base is diethylamine or dimethylethanolamine.

References Cited
UNITED STATES PATENTS

| | | | |
|---|---|---|---|
| 3,347,957 | 10/1967 | Adomaitis | 260—88.1 R |
| 3,373,224 | 3/1968 | Mesrobian et al. | 260—88.1 R |
| 3,404,134 | 10/1968 | Rees | 260—88.1 R |
| 3,435,093 | 3/1969 | Cope | 260—88.1 R |
| 3,472,825 | 10/1969 | Walter et al. | 260—88.1 R |
| 3,436,363 | 4/1969 | Helin | 260—88.1 R |

HARRY WONG, Jr., Primary Examiner